Dec. 19, 1961  P. B. DAWSON, JR  3,013,766
SPHERICAL VALVE
Filed Jan. 13, 1958  3 Sheets-Sheet 1
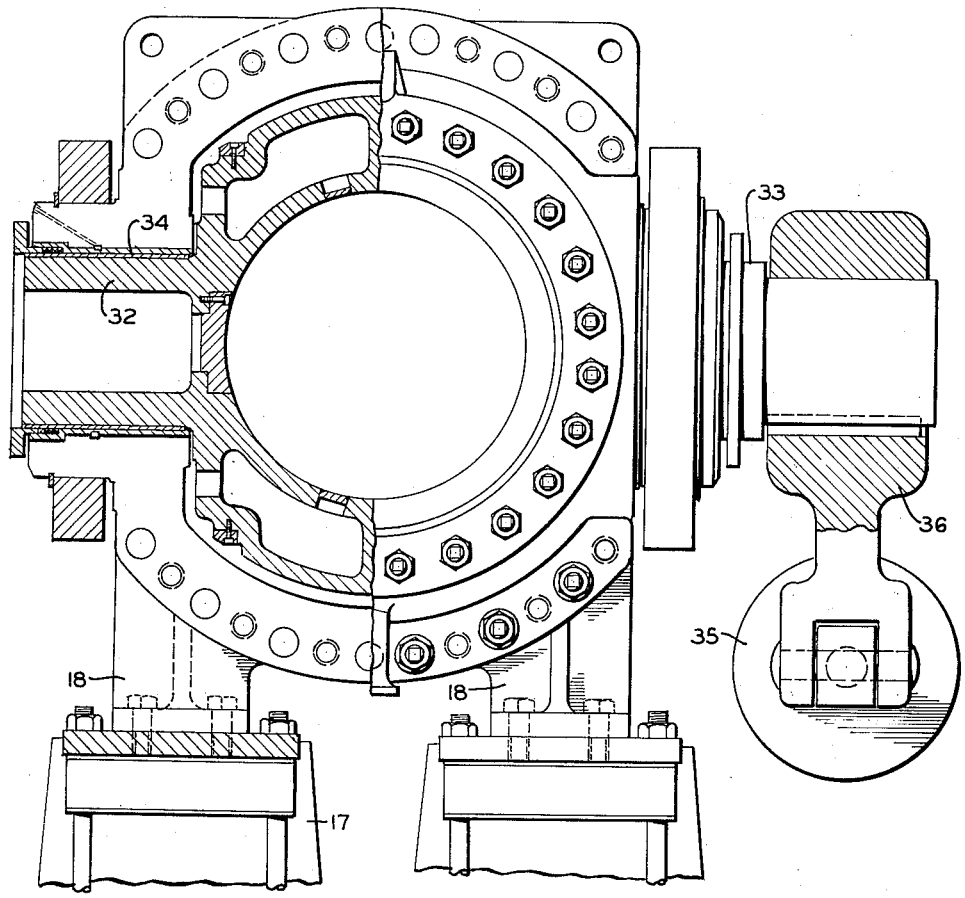
FIG_1
INVENTOR.
PERCY B. DAWSON, JR.
BY Lothrop & West
ATTORNEYS Dec. 19, 1961 P. B. DAWSON, JR 3,013,766
SPHERICAL VALVE
Filed Jan. 13, 1958 3 Sheets-Sheet 2
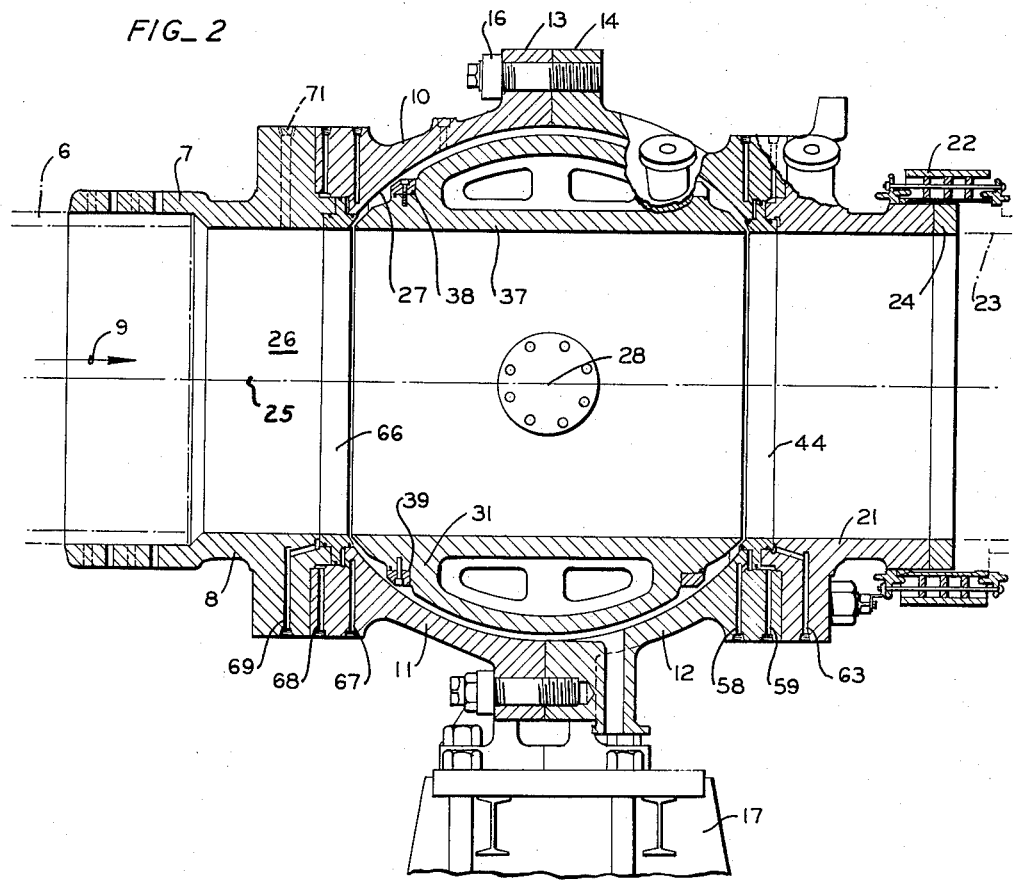
FIG_2
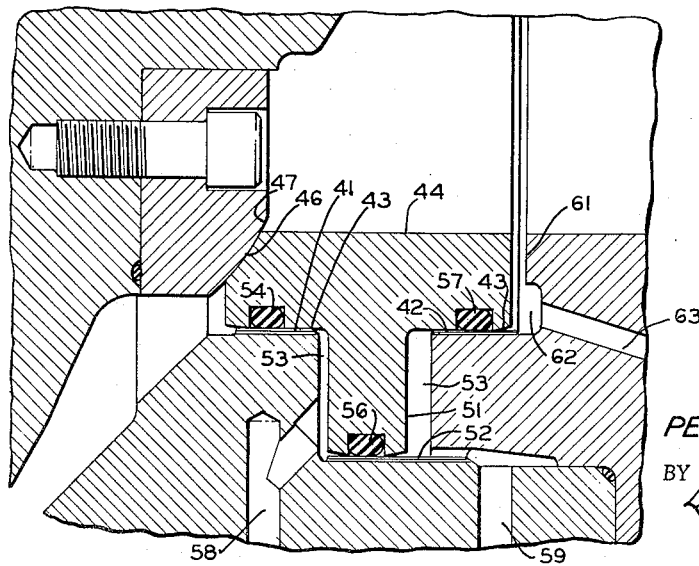
FIG_3
INVENTOR.
PERCY B. DAWSON, JR
BY Lothrop & West
ATTORNEYS Dec. 19, 1961 P. B. DAWSON, JR 3,013,766
SPHERICAL VALVE
Filed Jan. 13, 1958 3 Sheets-Sheet 3
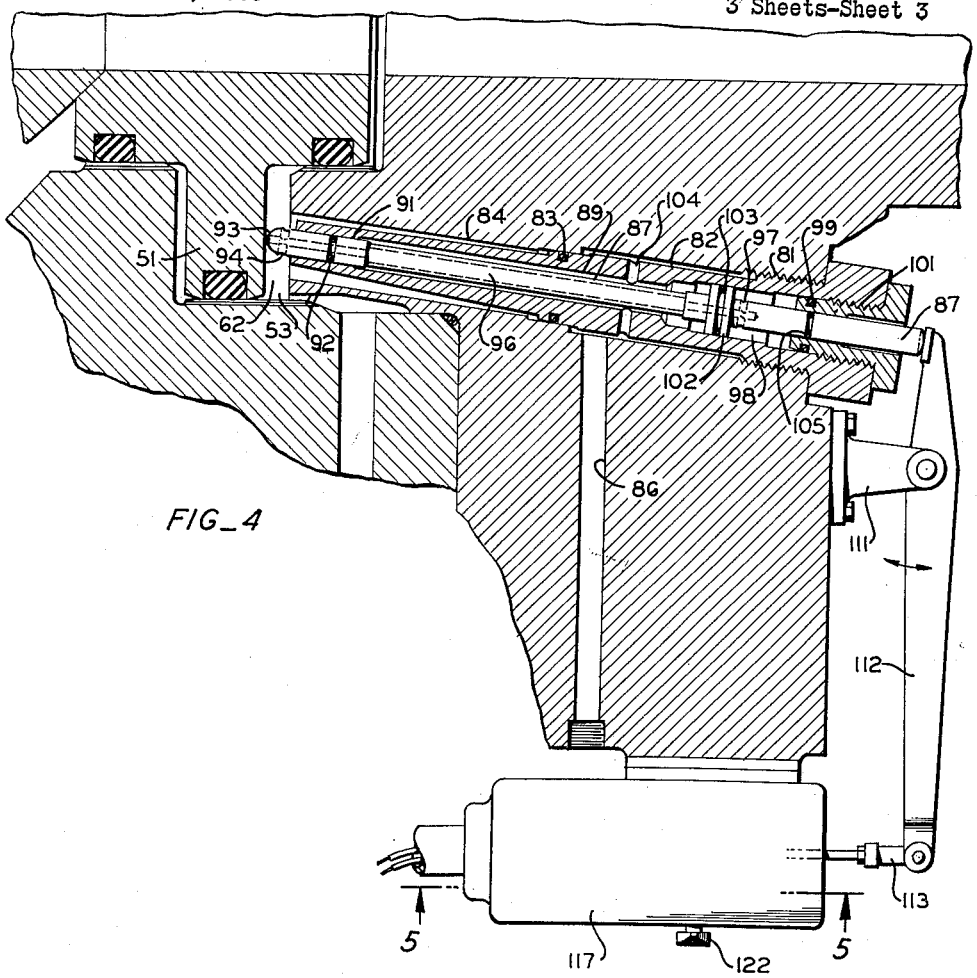
FIG_4
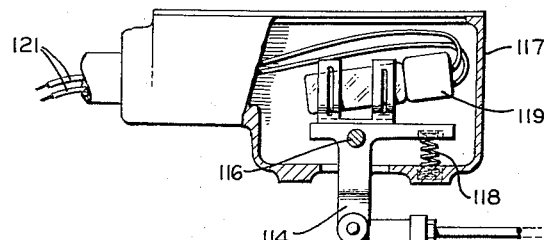
FIG_5
INVENTOR.
PERCY B. DAWSON, JR.
BY Lothrop & West
ATTORNEYS 3,013,766
SPHERICAL VALVE
Percy B. Dawson, Jr., Orinda, Calif., assignor to Baldwin-Lima-Hamilton Corporation, a corporation of Pennsylvania
Filed Jan. 13, 1958, Ser. No. 708,589
1 Claim. (Cl. 251—94)

My invention relates primarily to valves for controlling fluid flow in conduits and is especially concerned with a style of relatively large spherical valves normally utilized in hydraulic installations such as power houses or water works for controlling flow through relatively large conduits. Spherical valves have numerous practical advantages, but are sometimes difficult to seal properly against leakage when in closed position and are sometimes difficult to open or otherwise rotate if properly sealed.

It is therefore an object of my invention to provide a spherical valve which seals well when in closed position yet is easily moved from one position to another.

A further object of the invention is to provide a spherical valve in which the sealing of the valve is not necessarily dependent upon the effectiveness of but one sealing device.

Another object of the invention is to provide a spherical valve which can readily be incorporated in pipe lines or conduits of the customary sort.

A still further object of the invention is to provide a spherical valve having a relatively smooth flow passage when in open position.

A still further object of the invention is to provide a spherical valve with an external indication of the internal condition of the valve.

An additional object of the invention is in general to provide an improved spherical valve.

Other objects together with the foregoing are attained in the embodiment of the invention described in the accompanying description and illustrated in the accompanying drawings in which:

FIGURE 1 is, on the left half, a cross-section on a transverse vertical plane through a spherical valve constructed in accordance with the invention, and on the right half is, for the most part, an end elevation of the spherical valve, certain parts of the actuating mechanism being shown in cross-section.

FIGURE 2 is a longitudinal cross-section on a vertical, axial plane of the valve illustrated in FIGURE 1.

FIGURE 3 is a cross-sectional detail to a considerably enlarged scale of part of the sealing ring structure illustrated in FIGURE 2.

FIGURE 4 is a cross-section substantially to the scale of FIGURE 3 at a different part of the periphery of a sealing ring showing a sensing mechanism.

FIGURE 5 is a detail showing part of the sensing structure in side elevation, a portion thereof being illustrated in cross-section the plane of which is indicated by the line 5—5 of FIGURE 4.

In the form of device illustrated herein it can be assumed that the installation is in part of a hydraulic line leading to a hydraulic turbine. In this installation the penstock 6 terminates in a connecting sleeve 7 forming part of an upstream flange unit 8, the direction of flow being indicated by the arrow 9 of FIGURE 2. The upstream flange unit 8 is included as a functionally integral but physically separate part of a split spherical valve housing 10 having an upstream portion 11 and a downstream portion 12. These portions are joined at meeting flanges 13 and 14 by a number of fasteners 16 so that the structure can be readily dismantled. A support is afforded by a suitable foundation 17 and legs 18 extend from the various parts of the casing for connection to the foundation.

Likewise included as a physically separate, but functionally integral part of the spherical valve housing 10 is a downstream flange unit 21. This is connected by a readily removable, flexible connector joint 22 of a standard kind to a downstream conduit 23. Preferably a removable filler ring 24 is included within the connector joint 22 so as to afford a smooth passage for the flowing fluid. When the joint 22 and the ring 24 are removed, the downstream flange unit 21 can be removed to afford access to the valve interior without disturbing other parts of the installation.

The assembled portions as described are all substantially circular cylindrical in cross-section and are all concentric with or symmetrical with the axis 25 of a through flow passage 26. The housing 10 between its ends is enlarged to provide a substantially spherical chamber 27. This chamber is not a complete sphere, but intercepts the circular cylindrical flow passage 26 substantially as determined by the center 28 of the spherical chamber 27 which preferably is located on the axis 25.

Disposed to occupy much of the spherical chamber 27 is a spherical valve rotor 31 mounted on supporting tubes 32 and 33. These are borne in suitable journal bearings 34 in the housing 10. A power actuating device 35 is secured to one of the tubes, such as 33, by an actuating arm 36, so that the rotor can be revolved about the center 28 between an open position as shown in FIGURE 2 and a closed position rotated ninety degrees therefrom.

The rotor 31 in its open position as shown in FIGURE 2 is disposed to have a central duct 37 therethrough in substantial alignment with the flow passages in the end flange units 8 and 21, but when rotated into closed position is disposed so that certain removable seat rings 38 and 39 are in substantial concentricity with the axis 25 both at the upstream end of the chamber 27 and at the downstream end thereof. This closed position of the valve is illustrated in detail in FIGURE 3.

While the valve as so far described can readily be rotated between open and closed positions, it is not in itself well enough sealed against leakage for normal usage. To that end, special sealing means are provided. On the downstream side of the valve, the valve housing is provided with special construction. This occurs in practice in both the downstream housing portion 12 and in the downstream flange unit 21, but for description is considered as being in the housing considered as a whole.

Concentric with the axis 25, and of somewhat greater diameter than the diameter of the through passage are two cylindrical ways 41 and 42 (FIGURE 3). The ways 41 and 42 are of similar superficial diameter and are of substantially the same axial length. Also they are spaced apart a substantially equal amount. Each one of them is provided with a suitable facing material 43 for long wearing properties.

Adapted to slide on the ways 41 and 42 is a downstream sealing ring 44 having an inner diameter substantially the same as that of the interior of the passageway through the valve. The sealing ring 44 has on its upstream end a spherical surface 46 designed to rest in tight abutment with a similar spherical surface 47 on the seat ring 39 when such ring is in closed position.

When the sealing ring 44 is in the abutting position shown in FIGURE 3, substantially no leakage is possible between the surfaces 46 and 47 and the valve is then tightly closed. When the sealing ring 44 is retracted or slid along the ways 41 and 42, a substantial space exists between the surfaces 46 and 47 and the sealing is not particularly effective, but the valve rotor 31 is readily turned from one position to another.

In order that the sealing ring 44 can readily be axially translated between its sealing position and its free position, the ring is provided with a radial extension 51 in effect forming a piston which extends into and is slidably engaged with the outer wall 52 of a cylinder 53. The outer wall 52 is substantially concentric with the axis 25 and is interposed between the ways 41 and 42. Suitable seals 54, 56, and 57 are provided so that the cylinder 53 is substantially fluid tight and is devoid of material leakage.

In order that the sealing ring 44 can be moved by the piston or extension 51, the housing is provided with passages 58 and 59 opening into the cylinder 53 on opposite sides of the piston 51. The passages 58 and 59 lead to a suitable source of valve control fluid under high pressure and to a low pressure release so that a differential pressure can be established in either direction on opposite sides of the extending piston 51. Thus, when the pressure within the cylinder 53 on the downstream side of the piston is greater than it is in the cylinder 53 on the upstream side of the piston, the sealing ring 44 is translated into the sealing position shown in FIGURE 3. That is the situation when the pressure within the passage 59 is higher than the pressure within the passage 58. Oppositely, when the pressure is higher in the passage 58 than it is in the passage 59, the pressure on the upstream side of the piston 51 within the cylinder 53 is greater than that on the downstream side thereof and the sealing ring 44 and its integral piston 51 are translated to the right in FIGURE 3. This leaves a clearance space between the surfaces 46 and 47 so that the spherical valve then can be readily rotated.

In order to make the movement of the sealing ring completely free even after long usage during which silt and debris from the flowing fluid may deposit, the end of the sealing ring 44 stops at an abutment 61 partially bounding a collecting annulus 62 into which particles of foreign matter can fall or settle. A drain duct 63 leads to a suitable waste point so that the annulus 62 can be flushed or drained either periodically or continuously. A free path is thus always available for the sealing ring 44.

In the open position of the valve, as shown in FIGURE 2, the sealing ring 44 is usually kept clear of the valve rotor and in contact with the abutment 61 so that there is provided a substantially continuous flow path. There is only a minor interruption near the valve rotor and debris passing through this gap is easily drained away. In the closed position of the valve, the sealing ring 44 is in the position shown in FIGURE 3. When the valve rotor is between open and closed positions, the sealing ring 44 is retracted so that space exists between the surfaces 46 and 47.

As conditions require, the downstream sealing ring 44 can be utilized by itself or it can be supplemented by an upstream sealing ring 66. Also, the upstream sealing ring 66 can be utilized alone without the downstream sealing ring 44. In most instances it is preferred that both the sealing rings 44 and 66 be utilized. The mechanical arrangement surrounding the sealing ring 66 is identical with that surrounding the sealing ring 44, there being provided actuating fluid passages 67 and 68 corresponding respectively with the passages 58 and 59. Also, there is a drain passage 69 for flushing out collected debris. If desired, the pressure fluid for use in the various passages 58 and 59 as well as 67 and 68 can be derived from a pressure tap 71 taking off from the upstream side of the through passage way. A separate actuating fluid source can be provided if desired. This portion of the structure and the valving mechanism is relatively standard and therefore is not illustrated in detail.

In the usual operation of the valve, whenever the valve rotor is to be moved both of the sealing rings 44 and 66 are first positioned in a retracted location. When the rotor is in either of its extreme positions; that is, either fully closed or fully open, the sealing rings 44 and 66 are then in abutment with the rotor, either against the packing rings 38 and 39 or against the plane faces of the rotor as shown in FIGURE 2. In order that this can be done it is avdisable to determine the exact position of the sealing rings 44 and 66. For this reason there is provided, as shown in FIGURE 4, a sensing mechanism, generally designated 81, which is preferably disposed at an appropriate location on the downstream flange unit 21.

The sensing mechanism includes an outer supporting tube 82 screwed into the flange unit and appropriately sealed against leakage by a packing 83. The tube 82 is disposed in a bore 84 opening into the downstream cylinder 53. The bore 84 also opens into a drain passage 86 on the other side of the packing 83.

Disposed within the tube 82 there is a contact rod 87 making a loose fit therein to afford a surrounding annular passage way 89. At the end of the rod is a contact cup 91 designed to abut the piston 51. A sealing ring 92 precludes leakage. The cup is provided with a longitudinal bore 93 and a cross bore 94 so that pressure fluid within the cylinder 53 can flow into the interior of the hollow rod 87 being conducted through a central passage way 96 therein to a cross bore 97 opening into a chamber 98 within the tube 82. At one end, the chamber 98 is sealed by a packing ring 99 and a closure plug 101, and at its other end is closed by a movable piston 102 secured to the rod 87 and provided with its own packing 103. Drainage from the cylinder 98 on the opposite side of the piston 102 is through the passage way 89 and through a cross bore 104 into the drainage passage way 86. On the other side of the piston 102 the rod 87 emerges through the closure plug 101 leakage being prevented by a sealing ring 105.

With this mechanism, when there is pressure within the cylinder 53 the effect thereof is felt through the bores 93 and 94 on the right hand side of the piston 102, as seen in FIGURE 4. The pressure fluid then flows through the central passage way 96 and the cross bore 97 into the chamber 98. This pressure is not opposed since on the opposite side of the piston there is drainage through the passage way 89 and the cross bore 104 to the drain passage 86. While there is pressure existing within the cylinder 53 there is a comparable pressure within the chamber 98, and the rod 87 is forced against the piston 51 of the downstream sealing ring 44. Thus the sensing rod 87 always follows the movement of the downstream ring. This affords an exterior indication where the rod 87 emerges from the housing.

Advantage is taken of this exteriorly available indication to operate an interlock. Mounted on the housing is a fulcrum support 111 carrying a rocker lever 112 having one end abutting the emergent end of the rod 87. The other end of the rocker lever is connected by a link 113 to a bell crank lever 114 having a fulcrum shaft 116 within a casing 117 secured properly to the housing 9. A spring 118 serves to urge the linkage so that the rocker lever 112 always is in abutment with the rod 87 and follows the movement thereof. The bell crank lever 114 also serves as a mounting and actuator for a mercury switch 119 having conductors 121 extending therefrom. These go either to an indicator (not shown) for affording a visual display of the instantaneous position of the downstream packing ring or go to an electric interlocking circuit (not shown) for the mechanism which controls the actuating cylinder 35 so that the device 35 can be operated only when the ring 44 is retracted. In addition to this remote indication or interlock, the casing 117 also carries an exterior indicating needle 122 on the shaft 116 for a further showing of sealing ring location. A similar indicator and interlock can be provided for the upstream ring, as well.

What is claimed is:

A spherical valve comprising a housing having a flow passage therethrough, a spherical rotor having a duct therethrough, means for mounting said rotor in said housing for rotation between two positions in one of which said duct and said passage are in alignment and in the other of which said rotor blocks said passage, means in said housing forming a pair of aligned cylindrical ways concentric with said rotor, means in said housing forming a cylinder concentric with said rotor and disposed between said ways, a cylindrical sealing ring reciprocable on said ways, means in said housing forming an abutment at one end of said sealing ring, means forming a spherical surface at one end of said sealing ring, means forming an abutting surface at the other end of said sealing ring, said sealing ring being movable between a first position with said spherical surface abutting said rotor and a second position with said abutting surface contacting said abutment, a radial extension on said sealing ring reciprocable in said cylinder, means for connecting said cylinder on opposite sides of said extension to pressure fluid and to exhaust, means for rotating said rotor, means for reciprocating said sealing ring, a tube in said housing defining a chamber, a contact rod extending through said tube and said chamber from a point of contact with said radial extension to a point outside said housing, a piston fast on said contact rod and reciprocable in said chamber, means for subjecting said chamber on the side of said piston closest to said extension to drain pressure, means for subjecting said chamber on the side of said piston farthest from said extension to the pressure in said cylinder adjacent said rod, and means operated by said rod exteriorly of said housing for controlling the operation of said rotor and of said sealing ring.

References Cited in the file of this patent

UNITED STATES PATENTS

| | | |
|---|---|---|
| 870,487 | Bertram | Nov. 5, 1907 |
| 1,643,753 | Slattery | Sept. 27, 1927 |
| 2,001,271 | Smith | May 14, 1935 |
| 2,203,989 | Hamer | June 11, 1940 |
| 2,274,663 | Brisbane | Mar. 3, 1942 |
| 2,600,898 | Maxwell | June 17, 1952 |
| 2,630,832 | Lutherer | Mar. 10, 1953 |
| 2,654,924 | Wood | Oct. 13, 1953 |

FOREIGN PATENTS

| | | |
|---|---|---|
| 530,687 | Germany | July 31, 1931 |
| 139,860 | Australia | Jan. 5, 1951 |
| 684,621 | Great Britain | Dec. 24, 1952 |
| 1,155,199 | France | Nov. 25, 1957 |